G. E. McFADDEN.
CAR WHEEL.
APPLICATION FILED OCT. 27, 1913.

1,104,208.

Patented July 21, 1914.

Witnesses

Inventor
George E. McFadden.
By
Attorney

UNITED STATES PATENT OFFICE.

GEORGE E. McFADDEN, OF PULLMAN, ILLINOIS.

CAR-WHEEL.

1,104,208.  Specification of Letters Patent.  Patented July 21, 1914.

Application filed October 27, 1913. Serial No. 797,559.

*To all whom it may concern:*

Be it known that I, GEORGE E. McFADDEN, a citizen of the United States, residing at Pullman, in the county of Cook and State of Illinois, have invented certain new and useful Improvements in Car-Wheels, of which the following is a specification.

This invention relates to that class of car wheels which are loose on the axle, and its object is to provide a novel and improved bearing which automatically compensates for wear and thus prevents rattling and undue looseness which usually develops in free running wheels after they have been in use for some length of time.

This object is attained by means of a combination and arrangement of parts to be hereinafter described and claimed, reference being had to the accompanying drawing, in which—

Figure 1:
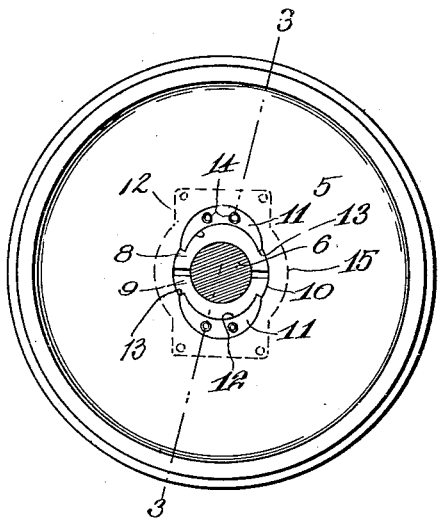
Figure 2:
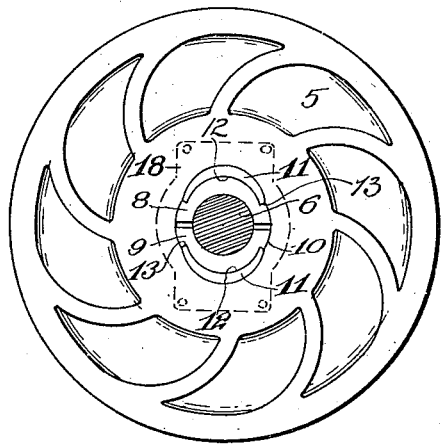
Figure 3:
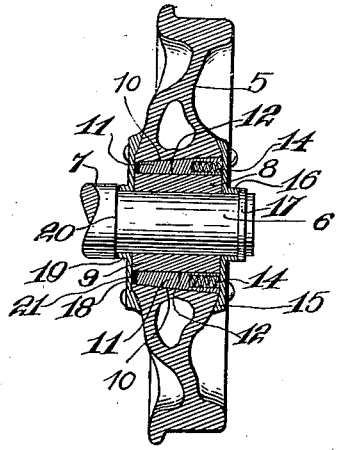

Figure 1 is a front elevation of the wheel, and Fig. 2 is a rear elevation thereof. Fig. 3 is a section on the line 3—3 of Fig. 1.

Referring specifically to the drawing 5 denotes a car wheel which is mounted to run freely with respect to the spindle 6 of the car axle 7. The spindle is encircled by a bearing bushing which is in two diametrically opposite sections, the same being indicated at 8 and 9, respectively. The hub bore 10 of the wheel is of a diameter to accommodate the bushing and also wear compensating devices 11, one of such devices being provided for each bushing section.

As clearly shown in Fig. 3, each compensating device 11 is a wedge shaped member seating in a recess 12 in the outer surface of the bushing section. The member is curved in cross-section, the recess being correspondingly shaped. The longitudinal edges of the member abut against shoulders 13 formed by the side walls of the recess, whereby the member is prevented from slipping around on the bushing. The outer surface of the member is inclined toward one end, whereby it is given a taper in the direction of its length. The inner surface of the member is parallel to the bushing. The hub bore 10 is tapered to conform to the taper of the compensating members, said members, as well as the bushing sections being located in the hub bore.

It will be evident from the foregoing that if there is any wear of the spindle 7 or the bushing sections 8 and 9, the same may be taken up by advancing the members 11 in the direction of their tapered ends, which movement of said members carries them toward the bushing sections to compensate for the wear. In order that this compensation may automatically be effected, I provide the larger ends of the members 11 with sockets in which seat coiled springs 14, said springs bearing against an abutment 15 carried by the wheel. The springs tend to advance the members 11 in a direction to take up the wear as hereinbefore described.

The abutment 15 is a plate which is bolted to the hub of the wheel 5 over the seats of the springs 14 and the ends of the bushing sections 8 and 9, and said plate has a hub 16 encircling the spindle 6. The outer end of the spindle has a shoulder or collar 17 which abuts against the hub 16. On the rear face of the hub of the wheel, over the corresponding ends of the bushing sections and the hub bore, is mounted a plate 18 which closes up this end of the hub bore. The plate 18 has a hub portion 19 through which the spindle 6 passes and which abuts against a shoulder 20 at the inner end of the spindle. This shoulder 20 and the collar 17 prevent the wheel from moving lengthwise on the spindle.

The members 11 are slightly shorter than the hub bore 10, leaving a space at the inner end thereof to receive a packing 21.

The invention is not limited to car wheels, but may be applied to various kinds of bearings, and it is also to be understood that minor changes in the structural details may be made without departure from the spirit and scope of the invention as claimed hereinafter.

I claim:

1. The combination of a rotating member and a support therefor; of a sectional bearing bushing encircling the support, wear-compensating members in contact with the outer surface of the bushing sections and movable in the direction of the length thereof, said members being tapered in the direction of their length, the rotating member having a bore to accommodate the bushing sections and the wear-compensating members, said bore being tapered to conform to the taper of said wear-compensating members, springs engageable with the wear-compensating members for forcing the same in a direction to compensate for wear of the bushing sections, and plates mounted over the ends of the hub bore, against one of which plates the aforesaid springs abut, said plates having hub portions through which the support passes, said support having shoulders between which the aforesaid hub portions are located.

2. The combination of a rotating member and a support therefor; of a sectional bearing bushing encircling the support, wear-compensating members in contact with the outer surface of the bushing sections and movable in the direction of the length thereof, said members being tapered in the direction of their length, the rotating member having a bore to accommodate the bushing sections and the wear-compensating members, said bore being tapered to conform to the taper of said wear-compensating members, springs engageable with the wear-compensating members for forcing the same in a direction to compensate for wear of the bushing sections, and plates mounted over the ends of the hub bore, against one of which plates the aforesaid springs abut, the other plate closing the corresponding end of the hub bore, which bore is longer than the wear-compensating members to provide a packing space in said bore at the smaller end of said members.

3. The combination of a rotating member and a support therefor; of a sectional bearing bushing encircling the support and having recesses in its outer surface, wear-compensating members seating in said recesses and movable in the direction of the length of the bushing sections, said members being tapered in the direction of their length, the rotating member having a bore to accommodate the bushing sections and the wear-compensating members, said bore being tapered to conform to the taper of said wear-compensating members, and springs engageable with the wear-compensating members for forcing the same in a direction to compensate for wear of the bushing sections.

In testimony whereof I affix my signature in presence of two witnesses.

GEORGE E. McFADDEN.

Witnesses:
S. J. LEHRER,
H. G. BATCHELOR.

---

Copies of this patent may be obtained for five cents each, by addressing the "Commissioner of Patents, Washington, D. C."